US012608579B2

(12) United States Patent
Sismundo et al.

(10) Patent No.: US 12,608,579 B2
(45) Date of Patent: Apr. 21, 2026

(54) DUAL INTERFACE LAMINATED CARD AND CORRESPONDING METHOD FOR MANUFACTURING A DUAL INTERFACE LAMINATED CARD

(71) Applicant: STMicroelectronics International N.V., Geneva (CH)

(72) Inventors: Antonio Sismundo, Frattamaggiore (IT); Giuliano Filpi, Caserta (IT); Antonio Amoroso, Recale (IT); Massimo Sena, Marigliano (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 18/830,236

(22) Filed: Sep. 10, 2024

(65) Prior Publication Data

US 2025/0111186 A1 Apr. 3, 2025

(30) Foreign Application Priority Data

Sep. 29, 2023 (IT) ........................ 102023000020178

(51) Int. Cl.
*G06K 19/02* (2006.01)
*G06K 19/077* (2006.01)
(52) U.S. Cl.
CPC . *G06K 19/07722* (2013.01); *G06K 19/07745* (2013.01); *G06K 19/07749* (2013.01)
(58) Field of Classification Search
CPC ....... G06K 19/07722; G06K 19/07749; G06K 19/07745; G06K 19/0723; G06K 7/10316; G06K 19/07; G06K 19/07747
(Continued)

(56) References Cited

U.S. PATENT DOCUMENTS

2008/0150701 A1* 6/2008 Randmae .............. B29C 48/157
340/10.5
2018/0323139 A1 11/2018 Degeilh et al.
(Continued)

FOREIGN PATENT DOCUMENTS

WO 2021262994 * 12/2021 ............. G06K 19/02
WO 2023051953 * 4/2023 ....... G06K 19/07747

OTHER PUBLICATIONS

Search Report, "Ministero delle Imprese e del Made in Italy, Rapporto Di Ricerca", IT202300020178, Stmicroelectronics International N.V., Mar. 20, 2024, 6 pages.
(Continued)

*Primary Examiner* — Daniel St Cyr
(74) *Attorney, Agent, or Firm* — Slater Matsil, LLP

(57) ABSTRACT

A dual interface laminated card having a stack of layers includes at least a first core plastic layer, a second core plastic layer disposed over the first core plastic layer, an antenna inlay disposed between the second core plastic layer and first core plastic layer, and a micromodule disposed over the second core plastic layer. The core plastic layers are recycled plastic layers comprising a major percentage, in particular at least 80%, of low surface energy plastic. The laminated card further comprises at least a first layer of polyurethane heat activatable glue, coupled to a side facing the antenna inlay of at least one of the first and second core plastic layers such that the antenna inlay and the at least one core plastic layer are bonded together.

21 Claims, 3 Drawing Sheets

(58) Field of Classification Search
USPC ........................................ 235/488, 487, 492
See application file for complete search history.

(56) References Cited

U.S. PATENT DOCUMENTS

| | | | |
|---|---|---|---|
| 2022/0126621 A1* | 4/2022 | Sangkaratana ........ | B42D 25/42 |
| 2023/0306229 A1 | 9/2023 | Michieli et al. | |

OTHER PUBLICATIONS

THALES Buidling a future we can all trust, "Parley for the Oceans
and Thales: eco-inventive cards for a cause", https://www.thalesgroup.
com/en/markets/digital-identity-and-security/banking-payment/cards/
parley-ocean-plastic, 10 pages, printed Sep. 10, 2024.

* cited by examiner

DUAL INTERFACE LAMINATED CARD AND CORRESPONDING METHOD FOR MANUFACTURING A DUAL INTERFACE LAMINATED CARD

CROSS-REFERENCE TO RELATED APPLICATIONS

This application claims the benefit of Italian Patent Application No. 102023000020178, filed on Sep. 29, 2023, which application is hereby incorporated herein by reference.

TECHNICAL FIELD

Embodiments relate to a dual interface laminated card comprising a stack of layers including an antenna inlay disposed between core plastic layers and a micromodule, and also to a corresponding method for manufacturing a dual interface laminated card.

Embodiments may be applied to the manufacturing of chip cards, e.g., banking or transportation cards.

BACKGROUND

Dual interface cards, which are known, are cards, e.g., credit cards, with an embedded chip that allows both contact and contactless communication. In the interest of environmental preservation, credit card issuers are considering to incorporate recycled plastic in the fabrication of their cards. Conventional credit cards are manufactured from polyvinyl chloride (PVC), a synthetic polymer derived from oil. Despite its durability, PVC does not decompose naturally but retains its form for decades before fragmenting into smaller plastic particles known as microplastics. The utilization of recycled plastic counteracts the spread of plastic waste and confines carbon emissions, thereby contributing to the reduction of environmental contamination. Moreover, a growing number of consumers are becoming increasingly aware of the environmental implications of their choices and thus prefer eco-friendly products, hence the provision of credit cards fabricated from recycled plastic aims to accommodate consumer preferences in this regard.

Annually, millions of payment cards are produced globally. Typically replaced every three to four years, these cards collectively result in millions of tons of plastic waste in landfills, with a significant portion of such waste entering oceans and other water bodies.

While plastic recovery and reuse efforts have been ongoing for many years, it is only recently that such efforts have focused on the collection, recovery and post—consumer use of ocean—bound plastic waste. Recovered ocean—bound plastic waste includes several low surface energy plastics, such as high—density polyethylene (HDPE), typically formed in to pellets or flakes for manufacture and use in products. These types of plastics are widely used due to their advantageous properties such as resistance to wear, chemical inertness, and low friction. A low surface energy plastic is here a plastic with a surface energy up to 40 dyne/cm (or milliJoules/m$^2$), in variant embodiments up to 36 dyne/cm, in further variant embodiments below 36 dyne/cm. A minimum value may be 15 dyne/cm.

However, the usage of low surface energy plastics presents drawbacks when it comes to the process of adhesion, particularly in scenarios where multiple layers need to be bonded together. The inherent low surface energy of these plastics makes it difficult for adhesives to form a strong bond. This is because the adhesive is unable to effectively "wet out" or spread across the surface of the plastic, which achieves a strong bond. This issue can lead to suboptimal performance in applications where strong adhesion between multiple layers of material is required.

The problem may be particularly relevant when the plastic sheet used for the card contains more than 80% of low surface energy plastic, e.g., r-HDPE, to obtain a card with a sufficient durability, e.g., at least three years, which is compliant with standards, such as CQM and Visa.

SUMMARY

Considering the foregoing, an object of various embodiments of the present disclosure is to provide solutions that are able to overcome one or more of the limits of the prior art.

According to one or more embodiments, one or more of the previous objects are achieved by a dual interface laminated card having the distinctive elements specified in the ensuing claims. The solution refers to a method for manufacturing such dual interface laminated card.

The claims form an integral part of the technical teaching of the disclosure provided herein. As mentioned previously, various embodiments of the present disclosure regard a dual interface laminated card A dual interface laminated card comprising a stack of layers, comprising at least a first core plastic layer, a second core plastic layer disposed over the first core plastic layer, an antenna inlay disposed between the second core plastic layer and first core plastic layer, and a micromodule disposed over the second core plastic layer. The core plastic layers are recycled plastic layers comprising a major percentage, in particular at least 80%, of low surface energy plastic, and the laminated card comprises at least a first layer of polyurethane heat activatable glue, coupled to a side facing the antenna inlay of at least one of the first core plastic layer and second core plastic layer, bonding the antenna inlay and the at least one core plastic layer together.

In embodiments, the card comprises a first layer of polyurethane heat activatable glue and a second layer of polyurethane heat activatable glue, respectively coupled to a side facing the antenna inlay of each of the first core plastic layer and second core plastic layer, bonding the antenna inlay and the core plastic layers together.

In embodiments, comprises only a layer of polyurethane heat activatable glue coupled to a side facing the antenna inlay of the first core plastic layer, bonding the antenna inlay and the first core plastic layer together.

In embodiments, the micromodule is bonded to the second core plastic layer by means of a bi-adhesive material.

In embodiments, it further comprises a bi-coated high surface energy material comprising a layer of high surface energy plastic, covered on both sides with an adhesive layer, placed in between the antenna inlay and the first layer of polyurethane heat activatable glue.

In embodiments, the micromodule and the bi-adhesive material are received in a cavity obtained in the second core plastic layer, the cavity extending vertically along the entire thickness of the second core plastic layer, in particular from the side facing a second overlay layer to the side facing the bi-coated high surface energy material, the bi-adhesive material extending vertically along the entire depth of the cavity.

In embodiments, the bi-adhesive material is a heat activatable bi-adhesive.

In embodiments, the micromodule and the bi-adhesive material are received in a cavity obtained in the second core plastic layer, the cavity extending vertically from an upper side of the second core plastic layer to an inner portion of the second core plastic layer, the bi-adhesive material extending vertically along the entire depth of such cavity.

In embodiments, the bi-adhesive material is a high bond acrylic glue or a bi-component epoxy resin.

In embodiments, the card comprises a second overlay layer and a first overlay layer, wherein the overlay layers are printable and graphically customizable, in particular made in polyvinyl chloride.

In embodiments, the layers comprising a major percentage, in particular at least 80%, of low surface energy plastic, the low surface energy plastic is substantially recycled high-density polyethylene.

In embodiments, the low surface energy plastic is a recycled plastic with a surface energy up to 40 dyne/cm, in particular up to 36 dyne/cm, in further variant embodiments below 36 dyne/cm.

The solution described herein refers also to a method for manufacturing comprising forming a stack comprising an antenna inlay between a first core plastic layer and a second core plastic layer, embedding a micromodule at least in the first core plastic layer, and employing as the core plastic layers comprising a major percentage, in particular at least 80%, of low surface energy plastic, preferably recycled high-density polyethylene. The forming comprises depositing at least a layer of polyurethane heat activatable glue, respectively on a side facing the antenna inlay of the second core plastic layer, and assembling the stack by applying pressure and heat to it to activate the polyurethane heat activatable glue.

In embodiments, the forming comprises depositing a first layer of polyurethane heat activatable glue and a second layer of polyurethane heat activatable glue, respectively on a side facing the antenna inlay of each of the second core plastic layer and first core plastic layer. In embodiments, the forming comprises depositing one layer of polyurethane heat activatable glue, respectively coupled to a side facing the antenna inlay of the second core plastic layer, in order to bond the antenna inlay and the core plastic layers together.

In embodiments, the method comprises milling the card to obtain a cavity for embedding the micromodule, and embedding the micromodule by means of a bi-adhesive material.

In embodiments, the forming further comprises applying a bi-coated high surface energy material between the antenna inlay and the first layer of polyurethane heat activatable glue.

In embodiments, the method comprises arranging the micromodule and the bi-adhesive material in the cavity obtained in the first core plastic layer, the milling the card to obtain a cavity for embedding the micromodule comprising obtaining a cavity extending vertically along the entire thickness of the first core plastic layer, the bi-adhesive material extending vertically along the entire thickness of the first core plastic layer.

In embodiments, the method comprises arranging the micromodule and the bi-adhesive material in the cavity obtained in the first core plastic layer, the cavity extending vertically from an upper side of the first core plastic layer to an inner portion of the first core plastic layer, the bi-adhesive material extending vertically along the entire depth of such cavity.

In embodiments, after the milling of the cavity a pretreatment by corona or plasma pre-treatment on the cavity is performed.

In embodiments, the method comprises printing overlay layers for customization, in particular using a dispersion of color ink and polyurethane heat activatable glue, arranging the overlay layers on the external faces of the core plastic layers, performing the assembling the stack by applying pressure and heat to the layers ensemble to activate the polyurethane heat activatable glue, cutting the stack to obtain single cards, performing the milling the cards to obtain a cavity for embedding the micromodule, and embedding the micromodule by means of a bi-adhesive material.

DETAILED DESCRIPTION OF ILLUSTRATIVE EMBODIMENTS

In the ensuing description, various specific details are illustrated, aimed at providing an in-depth understanding of the embodiments. The embodiments may be provided without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present disclosure is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics may be combined in any adequate way in one or more embodiments.

The references used herein are provided only for convenience and hence do not define the sphere of protection or the scope of the embodiments.

As explained previously, various embodiments of the present disclosure regard a dual interface laminated card and corresponding manufacturing method.

Figure 1:
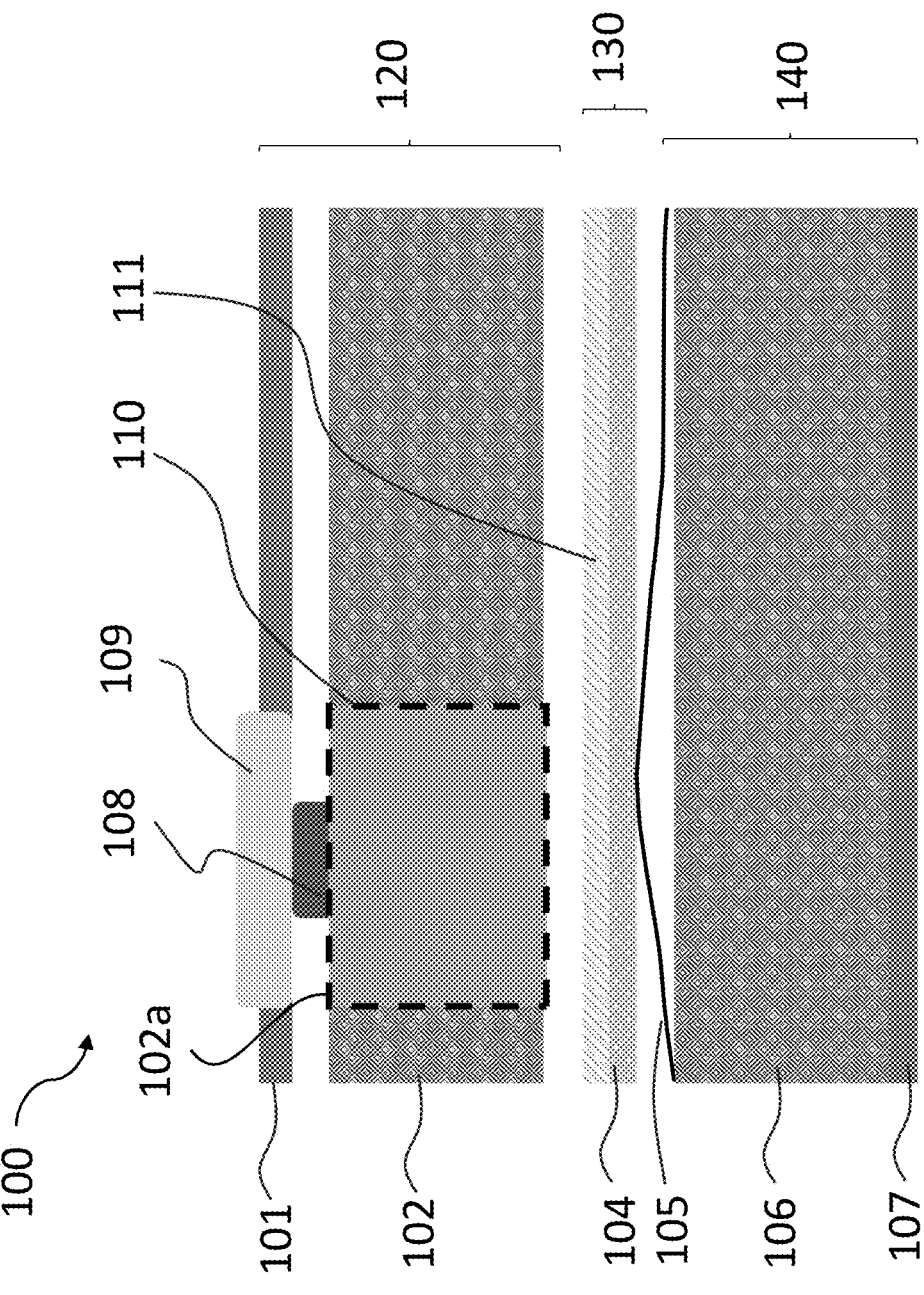
FIG. 1 shows a sectional view of a dual interface laminated card according to a first embodiment.

In one embodiment, illustrated in FIG. 1, a laminated card 100 comprises substantially a first core plastic layer 106, a second core plastic layer 102 arranged over the first core plastic layer 106, an antenna inlay 104 arranged between such first core plastic layer 106) and such first core plastic layer 102, a micromodule 108 arranged over the first core plastic layer 106.

More in detail, the card 100 comprises a plurality of stacked layers grouped in three parts: a front layers assembly 120, a back layers assembly 140 and in between a core assembly 130 comprising the antenna inlay 104 to provide contactless communication with a reader, here not shown, such as, for instance, a contactless Point Of Sale (POS), and a bi-coated high surface energy material layer 111.

The bi-coated high surface energy material layer 111 comprises substantially a layer of high surface energy plastic, e.g., PVC, covered on both sides with an adhesive or glue to improve adhesion, in particular an adhesive effective on high energy surfaces such as PVC, i.e. with a similar surface energy, i.e. at least in the range of high surface energy over 40 dyne/cm, to bond in particular with the antenna inlay 104, which may be made of PVC.

The front layers assembly 120 comprises, from an inner to an external face i.e., the upper or front face of the laminated card 100, a second core plastic layer 102, in which is obtained a cavity 102a, which in the embodiment shown is passing through the entire thickness of the second core plastic layer 102, a bi-adhesive material 110 filling such cavity 102a. The bi-adhesive material 110 may be a Hot Melt Adhesive (HMA). A Hot Melt or Hotmelt adhesive is usually a glue tape, heat activated double-sided film used for the embedding of chip modules into smartcard. Over the second core plastic layer 102, in the region of the bi-adhesive material 110 is placed a micromodule 108, over which is placed a second overlay layer 101. An array of electrical contacts 109 is coupled to the micromodule 108, arranged in an opening of the second overlay layer 101.

The second core plastic layer 102 can be made of a recycled plastic material, such as recycled high-density polyethylene (r-HDPE), or also recycled polyethylene terephthalate (r-PET). Such recycled materials can exhibit a low surface energy i.e., they can have a surface energy smaller up to 40 dyne/cm.

The bi-adhesive material 110 extends from the bi-coated high surface energy material 111, which represents the upper layer of the core assembly 130 to the micromodule 108 above, it is configured to embed the micromodule 108 in the cavity 102a, which is obtained in the second core plastic layer 102 and extending vertically along the entire thickness of the second core plastic layer 102, the bi-adhesive material 110 also extending vertically along the entire thickness of the second core plastic layer 102. In particular, the bi-adhesive material 110 occupies completely the cavity 102a.

According to a preferred embodiment, the bi-adhesive material 110 can be, for instance, a thermally activatable bi-adhesive material, i.e. a thermally activatable HMA. According to an embodiment, the bi-adhesive material 210 may be a high bond acrylic glue or a bi-component epoxy resin. The bi-adhesive material 110 may activated, i.e. heated over its thermal activation temperature, twice, the first when it is melted inside the cavity 102a, the second when the micromodule 108 is brought in contact with the layer 110 to promote embedding. Having the bi-adhesive material 110 in contact with the bi-coated high surface energy material 111 allows to employ a wide range of adhesives to embed the micromodule 108 into the appropriate cavity 102a. In order to satisfy quality requirements such as, for instance, the CQM (Card Quality Management) requirements, the bi-adhesive material 110 has a thickness of at least two times the thickness of a standard bi-adhesive material according to the state of the art.

The micromodule 108 may be electrically programmable and capable of storing data. It can be used for various applications such as identification, access control, payment transactions, and more.

The second overlay layer 101 is designed to protect the card from external sources of damage, and it can be personalized e.g., printed or metallized, by the card provider. The second overlay layer 101 can be made of polyvinyl chloride (PVC).

The array of electrical contacts 109 provides electrical access to the micromodule 108, to which it is electrically connected. The height of the array of electrical contacts 109 satisfies electrical and mechanical requirements, specified, for instance, by the MasterCard Card Quality Management (CQM) or the ISO 7810 and ISO 7816 standards.

The above-described layers comprised in the front layers assembly 120 i.e., the second core plastic layer 102 and the second overlay layer 101, are glued together, i.e. bonded by glue, to ensure mechanical strength and resistance to delamination according to the MasterCard CQM standard.

Thus in this embodiment the second core plastic layer 102 is bonded through the antenna inlay 104 through the bi-coated layer 111, which on its upper surface adheres in particular to the lower surface of the bi-adhesive material 110.

In order to deal with low surface energy plastics, where the low surface energy making the operation of bonding to other materials difficult due to a scarce adhesion of such low surface energy material to other surfaces and adhesives, the solution here described, as better detailed in the following, then provides to use glues which ensure good adhesion even on low surface energy materials, in particular polyurethane heat activatable glues. A Polyurethane (or Polyurethanic) Thermoactivable glue is a heat activated, solvent based adhesive on polyurethane basis.

Thus, the back layers assembly 140 comprises, from the inner i.e., upper, to the external i.e., lower, face, also the external face of the card 100, a first core plastic layer 106 and a first overlay layer 107.

Similar to the second core plastic layer 102, the first core plastic layer 106 can be made of a recycled plastic material, such as recycled high-density polyethylene (r-HDPE), or recycled polyethylene terephthalate (r-PET). More generally, such first core plastic layer 106 can be made of a low surface energy material i.e., a material with surface energy up to 40 dyne/cm.

The first overlay layer 107 is designed to protect the card from external sources of damage, and it can be personalized e.g., printed or metallized, by the card provider. The first overlay layer 107 can be made of polyvinyl chloride (PVC).

Figure 2:
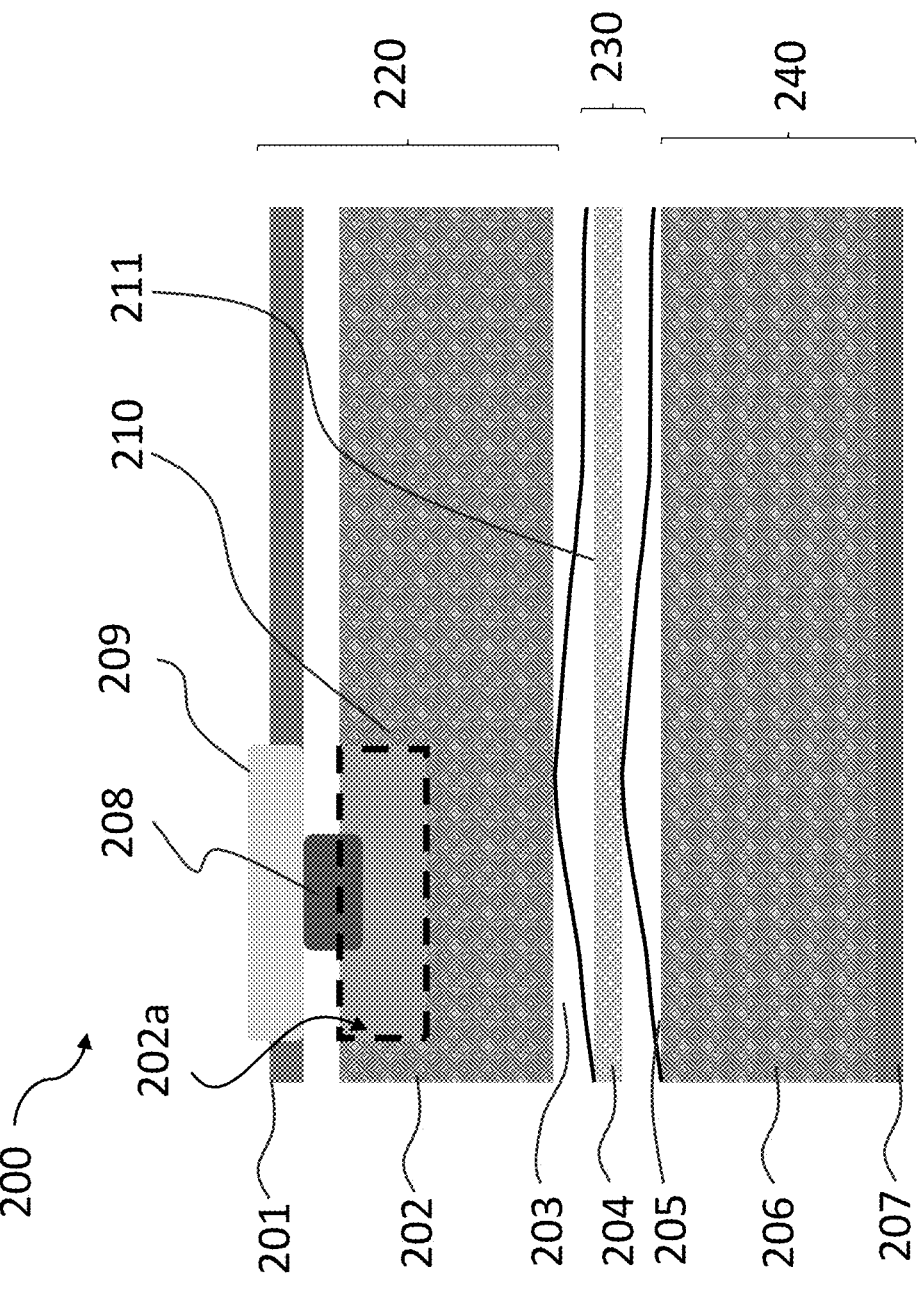
FIG. 2 shows a sectional view of a dual interface laminated card according to a second embodiment.

A further embodiment, illustrated in FIG. 2, shows a dual interface laminated card 200 comprising a first layer of polyurethane heat activatable glue 205 and a second layer of polyurethane heat activatable glue 203, respectively coupled to a side facing the antenna inlay 204 of each of a first core plastic layer 206 and second core plastic layer 202, bonding the antenna inlay 204 and the core plastic layers 202, 206 together.

Substantially, layers 201, 202, 204-207 in FIG. 2 correspond to layers 101, 102, 104-107 in the embodiment of FIG. 1.

More in detail the card 200 comprises a plurality of stacked layers grouped in three parts: a front layers assembly 220, a back layers assembly 240 and in between a core assembly 230 comprising an antenna inlay 204 to provide contactless communication with a reader such as, for instance, a contactless Point Of Sale (POS).

The front layers assembly 220 comprises, from the inner to the external face i.e., the upper or front face of the laminated card 200, a second core plastic layer 202, in which is obtained a cavity 202a, which in the embodiment shown extends along a portion of the thickness of the core plastic layer 202, a bi-adhesive material 210 filling such cavity 202a. Over the second core plastic layer 202, in the region of the bi-adhesive material 210, is placed a micromodule 208, over which is placed a second overlay layer 201. An array of electrical contacts 209 is coupled to the micromodule 208, arranged in an opening of the second overlay layer 101.

The second core plastic layer 202, as the layer 102, can be made of a recycled plastic material, such as recycled high-density polyethylene (r-HDPE), or recycled polyethylene terephthalate (r-PET). Such recycled materials can exhibit a low surface energy i.e., they can have a surface energy up to 40 Dyne/cm.

The bi-adhesive material 210 extends vertically from the side facing the second overlay layer 201 to an inner portion of the second core plastic layer 202 and it is configured to embed the micromodule 208 in a cavity 202a, obtained in the second core plastic layer 202 and extending vertically along the thickness of the second core plastic layer 202, starting from the side facing the second overlay layer 201 to an inner portion of the second core plastic layer 202.

The micromodule 208 is electrically programmable and capable of storing data. It can be used for various applications such as identification, access control, payment transactions, and more.

The second overlay layer 201 is designed to protect the card from external sources of damage, and it can be personalized e.g., printed or metallized, by the card provider. The second overlay layer 201 can be made of polyvinyl chloride (PVC).

The array of electrical contacts 209 provides electrical access to the micromodule 208, to which it is electrically connected. The height of the array of electrical contacts 209 must satisfy electrical and mechanical requirements, specified, for instance, by the MasterCard Card Quality Management (CQM) or the ISO 7810 and ISO 7816 standards.

The above-described layers comprised in the front layers assembly 220 i.e., the first core plastic layer 202 and the second overlay layer 201, are glued together to ensure mechanical strength and resistance to delamination according to the MasterCard CQM standard.

Furthermore, the first core plastic layer 202 is glued to the core assembly 230, specifically to the antenna inlay 204, by means of a polyurethane heat activatable glue layer 203, which is able to ensure a sufficiently strong bonding between the first core plastic layer 202 and the antenna inlay 204. Specifically, the employ of polyurethane heat activatable glue 203 allows to use low surface energy plastic materials, such as recycled high-density polyethylene (r-HDPE), as core plastic layers thanks to its good wetting properties on low surface energy materials. Specifically, the use of polyurethane heat activatable glue 103 allows to use low surface energy plastic materials, such as recycled high-density polyethylene (r-HDPE), as core plastic layers thanks to its good wetting properties on low surface energy materials (up to 40 dyne/cm).

The back layers assembly 240 comprises, from the inner i.e., upper, to the external i.e., lower, face, also the external face of the card 200, a first core plastic layer 206 and a first overlay layer 207.

Similar to the first core plastic layer, the first core plastic layer 206 can be made of a recycled plastic material, such as recycled high-density polyethylene (r-HDPE), or recycled polyethylene terephthalate. More generally, such first core plastic layer 206 can be made of a low surface energy material i.e., a material with surface energy up to 40 Dyne/cm.

The first overlay layer 207 is designed to protect the card from external sources of damage, and it can be personalized e.g., printed or metallized, by the card provider. The first overlay layer 207 can be made of polyvinyl chloride (PVC).

Thus, substantially, in this embodiment of card 200, the polyurethane glue, in particular by layer 203 is bonding also the antenna 204 to the second plastic core layer 202, while in the embodiment of card 100 only the first plastic core layer 106 is attached by the polyurethane glue, layer 105. There, the bi-coated layer 111 and the bi-adhesive material 110 instead interact to bond the assembly 120.

In view of the disclosure above, the solution here described refers to a dual interface laminated card i.e., a card with a single chip that can be used either in contact, for instance through a magnetic stripe or an EMV reader, and contactless operations, through Radio Frequency Identification (RFID) or Near Field Communication (NFC), and a corresponding method for the manufacturing thereof.

Such dual interface laminated card, according to the embodiments 100 or 200, comprises a stack of layers, comprising at least a first core plastic layer, e.g., 106 or 206, a second core plastic layer, e.g., 102 or 202, arranged over the first core plastic layer, e.g., 106 or 206, an antenna inlay, e.g., 104, 204, arranged between the first core plastic layer, e.g., 106, 206 and second core plastic layer e.g., 106, 206, and a micromodule, e.g., 108, arranged over the first plastic layer, e.g., 106, 206.

According to the solution described the core plastic layers e.g., 102, 106 and 202, 206, are recycled plastic layers comprising a major percentage, in particular at least 80%, of low surface energy plastic, e.g., with surface energy up to 40 dyne/cm, such as recycled high-density polyethylene (r-HDPE), sourced from oceans, and the laminated card e.g., 100, 200 comprises at least a first layer of polyurethane heat activatable glue e.g., 105 in card 100, or 203, 205 in card 200, coupled to a side facing the antenna inlay 104, 204 of at least one of the first core plastic layer 106, 206 and second core plastic layer 102, 202, bonding the antenna inlay 104, 204, and the at least one core plastic layer, e.g., 102, 106 or 202, 206, together.

As shown, in FIG. 2 at least one means two plastic layer 106, 102 with two polyurethane heat activatable glue 203, 205, while in FIG. 1 means only the first core plastic layer 106 coupled by the polyurethane heat activatable glue layer 105, while attachment of layer 102 is obtained by layers 110, 111. In variant embodiments, only the second core layer, e.g., 102 may be glued by polyurethane glue to the antenna layer, e.g., 104, while attachment of the first core plastic layer, e.g., 106 may be obtained by other means, although the embodiments 100 and 200 appear to present specific advantages, card 100 exploiting the bi-adhesive material and card 200 ensuring good adhesion of both the plastic layers.

Specifically, the use of polyurethane heat activatable glue enables using low surface energy plastics for manufacturing such dual interface laminated cards, thanks to the good mechanical properties, in particular resistance to delamination, yielding from the combination of such components, thereby allowing compliance to several quality standards, such as the MasterCard Card Quality Management (CQM) or the ISO 7810.

Also, the micromodule, 108, may be bonded to the first core plastic layer, 102, by means of a bi-adhesive material 110.

Also, the stack of the card may comprise bi-coated high surface energy material 111 placed in between the antenna inlay 104 and the first layer of polyurethane heat activatable glue 103.

As indicated, the cavity e.g., 102a or 202a, in the second core plastic layer, 102, receives the micromodule 108 and the bi-adhesive material 110. The cavity may extend vertically along the entire thickness of the second core plastic layer 102, in particular from the side facing a second overlay layer 101, if present, to the side facing the bi-coated high surface energy material 111, in particular the bi-adhesive material 110 extending along all the length of the cavity 102a. Also, as depicted in FIG. 2, the micromodule, e.g., 208, and the bi-adhesive material, e.g., 210, are received in a cavity 202a obtained in the first core plastic layer 202, the cavity, 202a, extending vertically from an upper side of the first core plastic layer, 202, i.e. the external side facing upwards opposed to the side facing the inlay layer 104, to an inner portion of the first core plastic layer, 202, such bi-adhesive material, 210, extending vertically along the entire depth of such cavity, 202a.

In embodiments, the bi-adhesive material 110 may be a heat activatable bi-adhesive. In embodiments, the bi-adhesive material, 210, may be a high bond acrylic glue or a bi-component epoxy resin.

In an exemplary embodiment, the core plastic layers 102, 106 or 202, 206 comprise at least 80% of recycled HDPE plastic.

As explained, although the solution refers more specifically to the inlay and core layers, the card preferably comprises also a second overlay layer 101 and a first overlay layer 107, wherein the overlay layers 101, 107 are printable and graphically customizable, in particular made in polyvinyl chloride (PVC).

Figure 3:
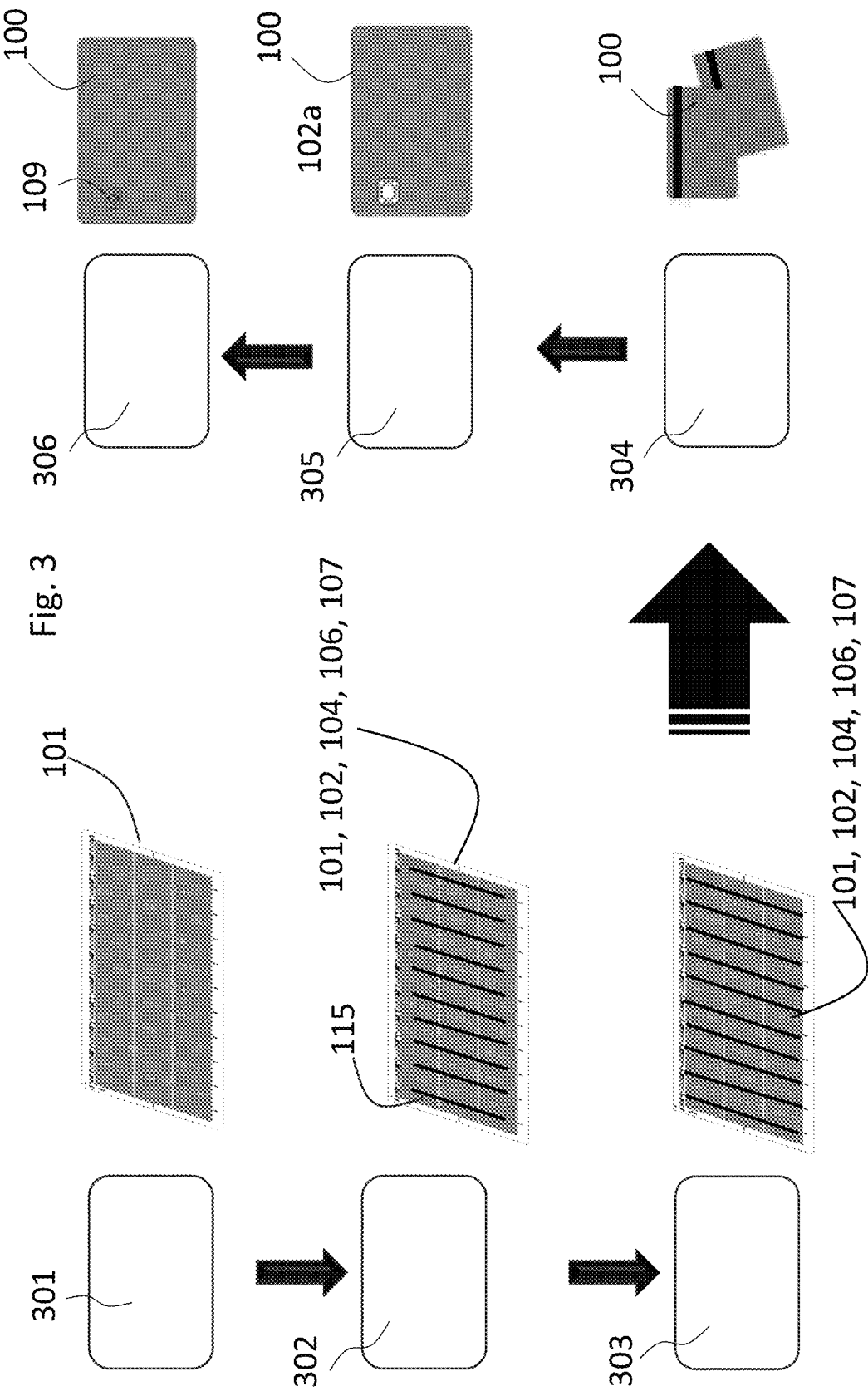
FIG. 3 shows a flow diagram representing an embodiment of a method for manufacturing dual interface laminated cards according to the solution here described.

In FIG. 3 it is shown an example of a method 300 for manufacturing dual interface laminated cards. In FIG. 3 it is shown a flow diagram with blocks corresponding to the method, alongside a schematic depiction of the intermediate (or final) product at that block. Thus the method 30 according to embodiments may comprise printing 301 the overlay layers 101, 107 (an array of overlay 101 is shown) for customization, preferably using a dispersion of color ink and polyurethane heat activatable glue. In particular, the first and second overlay layers 101, 107 are customized, then are glued on the first and second core plastic layers 106, 102 respectively, by means of glue, preferably polyurethane heat activatable glue, which is deposited on the inner faces of such first and second overlay layers 107, 101. The method includes gathering and pre-fixing 302 different layers (an array of layers 101, 102, 104, 106, 107 superimposed in a stack is shown by way of example), including overlay layers 101, 107, core plastic layers 102, 106, polyurethane heat activatable glue layers 103, 105 and antenna inlay 104. In particular, the layers are arranged in a stack of layers following an order according to the embodiments shown in the foregoing. A magnetic band 115 may also be applied on the card 100. The method further includes assembling 303 the stack or laminate by applying pressure and heat to the layers ensemble to activate the polyurethane heat activatable glue, cutting 304 the stack or laminate to obtain single cards 100, milling 305 the cards to obtain a cavity for embedding the micromodule 108, and embedding 306 the micromodule 108 by means of a bi-adhesive material 110.

Thus, the method 300 for manufacturing a dual interface laminated card 100 according to the solution here described, comprises in general forming a stack comprising an antenna inlay, 104, between the second core plastic layer, 102, and a second core plastic layer, 106 e.g., applying assembling 303, cutting 304, then embedding, 305-306, a micromodule, 108, at least in the second core plastic layer, e.g., 102, such method comprising employing as the core plastic layers, e.g., 102, 106, low surface energy plastic material layers, preferably recycled high-density polyethylene (r-HDPE), and depositing e.g., within assembling 303, at least a first layer of polyurethane heat activatable glue, e.g., 103, or a first layer of polyurethane heat activatable glue and a second layer of polyurethane heat activatable glue, e.g., 105, on a side facing the antenna inlay, e.g., 104, of the first core plastic layer or of each of the second core plastic layer, e.g., 102, and first core plastic layer, e.g., 106, then assembling e.g., 303, the stack, e.g., 102, 104, 106, by applying pressure and heat to it to activate the polyurethane heat activatable glue e.g., 103, 105.

Here the solution refers to a stack comprising at least the layers 102-104-106, e.g., without the overlay layers e.g., if customization is not provided or other layers with other functions. Of course, the stack may comprise such layers as well as depicted in FIG. 3.

In embodiments, the method also includes milling 305 the card to obtain a cavity, 102a, for embedding the micromodule, 108, and embedding, 306, the micromodule, 108, by means of a bi-adhesive material, e.g., 110.

Also, the forming may further comprise applying a bi-coated high surface energy material, e.g., 111, between the antenna inlay, 104, which in embodiments may comprise an integrated circuit electrically connected to a plurality of metallic windings, and the core plastic layer 102 The bi-coated high surface energy material may be preferably a high bond acrylic glue or a bi-component epoxy resin.

Also, it is provided arranging the micromodule, 108 and the bi-adhesive material 110, in the cavity obtained in the second core plastic layer 102, the milling 305 the card to obtain a cavity 102a for embedding the micromodule 108 comprising obtaining a cavity extending vertically along the entire thickness of the second core plastic layer 102, e.g., if present from the overlay layer to the side facing the bi-coated layer or the inlay layer 104, the bi-adhesive material 110 extending vertically along the entire thickness of the second core plastic layer 102.

In other embodiments, arranging the micromodule 108 and the bi-adhesive material 110 in the cavity obtained in the first core plastic layer 202, includes milling so that the cavity e.g., 202a, extends vertically from an upper side of the first core plastic layer, 202, in particular from the overlay 101 if present, to an inner portion of the first core plastic layer, 202, the bi-adhesive material 210 extending vertically along the entire depth of such cavity. Also, as shown, an array of electrical contacts 109 may be embedded in a cavity extending vertically along the entire thickness of the second overlay layer 101, the array of electrical contacts 109 being electrically coupled to the micromodule 108.

It is here specified that, after the milling, e.g., 305, of the cavity, 102a or 202a, to improve the adhesion of the micromodule 108 is possible to apply a pretreatment, such as a Corona or Plasma pre-treatment on the milling cavity 202a. Such Corona or Plasma pre-treatment may be used also on card body materials to increase the bonding between recycled materials and other materials.

The overlay and the inlay layers are usually made mainly of high surface energy materials such as PVC or PVC/ Acrylonitrile Butadiene Styrene (ABS).

Also, a more comprehensive embodiment of the method here described may also include printing, e.g., 301, overlay layers e.g., 101, 107, for customization, in particular using a dispersion of color ink and polyurethane heat activatable glue, arranging, e.g., 302, the overlay layers, e.g., 101, 107, on the external faces of the core plastic layers, 102, 106 i.e., upper face of layer 102 and lower face of layer 106, performing such assembling e.g., 303, the stack, in this case including also the overlays 101, 107, by applying pressure and heat to the layers ensemble to activate the polyurethane heat activatable glue, cutting e.g., singulating, 304 the sheet comprising the laminated stack to obtain single cards, performing the milling 305 the cards to obtain a cavity for embedding the micromodule 108 comprises removing a portion of material from the front layers assembly in order to obtain the cavity 102a for embedding the micromodule 108. According to the illustrated embodiments, the cavity may extend from the top surface of the front layers assembly 120 to the core assembly 130, or to an inner portion of the second core plastic layer 102. The method also includes embedding 306 the micromodule 108 by means of a bi-adhesive material 110, that, according to the embodiments of the solution above-described, may be a bi-adhesive specifically tailored for adherence on low surface energy materials, such as a high bond acrylic glue or a bi-component epoxy resin, or may be a heat activatable bi-adhesive.

The core plastic layers e.g., 102, 106, being low surface energy plastic material layers means that they comprise a major percentage (e.g., greater than 50%) or completely composed of low surface energy plastic material layers i.e., they include low surface energy plastic to the extent to ensure the described adhesion properties. In particular they contain at least 80% of low surface energy plastic material. Minor quantities of different plastic, which does not contribute to the adhesion properties determined by the low surface energy plastic material layers may be present.

Thus, on the basis of the description above, the operation of the solution here described is clear, as its advantages.

In view of the disclosure above, the solution here described advantageously provides cards with core recycled plastic layers composed by a low surface energy plastic material, such as recycled high-density polyethylene (r-HDPE) or polyethylene, sourced from oceans, such laminated card comprising at least a layer of polyurethane heat activatable glue coupled a recycled plastic layer, allowing bonding the antenna inlay and the core plastic layer or layers together ensuring a sufficiently strong bonding. Specifically, the use of polyurethane heat activatable glue enables using low surface energy plastics for manufacturing such dual interface laminated cards, thanks to the good mechanical properties, in particular resistance to delamination, yielding from the combination of such components, thereby allowing compliance to several quality standards, such as the MasterCard Card Quality Management (CQM) or the ISO 7810.

As indicated the core plastic layers in the solution are recycled plastic layers, in particular from sea source, in particular coastal areas. Such plastic layers comprise a major percentage, in particular at least 80%, of recycled low surface energy plastic, which may comprise r-HDPE and/or r-PET and/or or other low surface energy recycled plastic material.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A dual interface laminated card having a stack of layers, the card comprising:

a first core plastic layer;

a second core plastic layer disposed over the first core plastic layer, wherein the first and second core plastic layers are recycled plastic layers comprising a major percentage of a low surface energy plastic, wherein the low surface energy plastic is recycled high-density polyethylene (r-HDPE);

an antenna inlay disposed between the second core plastic layer and the first core plastic layer, wherein the antenna inlay comprises a polyvinyl chloride (PVC) material or a PVC/acrylonitrile butadiene styrene (ABS) material;

a micromodule disposed over the second core plastic layer; and at least a first layer of polyurethane heat activatable glue, coupled directly to a low surface energy plastic surface side facing the antenna inlay of at least one core plastic layer of the first and second core plastic layers, such that the antenna inlay and the at least one core plastic layer are bonded together.

2. The dual interface laminated card according to claim 1, wherein the card further comprises a second layer of polyurethane heat activatable glue, and wherein the first and second layers of polyurethane heat activatable glue are respectively coupled to a respective side facing the antenna inlay of each of the first and second core plastic layers, such that the antenna inlay is bonded to the first and second core plastic layers.

3. The dual interface laminated card according to claim 2, wherein the micromodule is bonded to the second core plastic layer with a bi-adhesive material.

4. The dual interface laminated card according to claim 3, further comprising a bi-coated high surface energy material comprising a layer of high surface energy plastic, covered on both sides with an adhesive layer, disposed between the antenna inlay and the first layer of polyurethane heat activatable glue.

5. The dual interface laminated card according to claim 4, wherein the micromodule and the bi-adhesive material are disposed in a cavity in the second core plastic layer, wherein the cavity extends vertically along an entire thickness of the second core plastic layer, from a first side facing a second overlay layer to a second side facing the bi-coated high surface energy material, and wherein the bi-adhesive material extends vertically along an entire depth of the cavity.

6. The dual interface laminated card according to claim 5, wherein the bi- adhesive material is a heat activatable bi-adhesive.

7. The dual interface laminated card according to claim 3, wherein the micromodule and the bi-adhesive material are disposed in a cavity in the second core plastic layer, wherein the cavity extends vertically from an upper side of the second core plastic layer to an inner portion of the second core plastic layer, and wherein the bi-adhesive material extends vertically along an entire depth of such cavity.

8. The dual interface laminated card according to claim 7, wherein the bi-adhesive material is a high bond acrylic glue or a bi-component epoxy resin.

9. The dual interface laminated card according to claim 1, wherein the card comprises only one layer of polyurethane heat activatable glue coupled to the side facing the antenna inlay of the first core plastic layer, such that the antenna inlay and the first core plastic layer are bonded together.

10. The dual interface laminated card according to claim 1, further comprising a first overlay layer and a second overlay layer, wherein the first and second overlay layers are printable and graphically customizable.

11. The dual interface laminated card according to claim 10, wherein the first and second overlay layers comprise the PVC material.

12. The dual interface laminated card according to claim 1, wherein the low surface energy plastic is a recycled plastic with a surface energy up to 40 dyne/cm.

13. A method for manufacturing a dual interface laminated card, the method comprising:

depositing a first layer of polyurethane heat activatable glue directly on a first low surface energy plastic surface side of a second core plastic layer;

placing an antenna inlay on the first layer of polyurethane heat activatable glue, the antenna inlay comprising a polyvinyl chloride (PVC) material or a PVC/acrylonitrile butadiene styrene (ABS) material;

placing a first core plastic layer on the antenna inlay to form a stack of layers, the first and second core plastic layers comprising a major percentage of a low surface energy plastic, the low surface energy plastic being recycled high-density polyethylene (r-HDPE);

applying pressure and heat to the stack of layers to activate the first layer of polyurethane heat activatable glue; and embedding a micromodule in the first core plastic layer.

14. The method according to claim 13, the forming comprising:

depositing a second layer of polyurethane heat activatable glue on a second side of the first core plastic layer facing the antenna inlay, the applying the pressure and heat activating the second layer of polyurethane heat activatable glue.

15. The method according to claim 13, the forming comprising:

depositing only the first layer of polyurethane heat activatable glue in order to bond the antenna inlay and the first and second core plastic layers together.

16. The method according to claim 13, further comprising:

milling the card to form a cavity in the first core plastic layer for embedding the micromodule; and embedding the micromodule with a bi-adhesive material.

17. The method according to claim 16, the milling the card to form the cavity for embedding the micromodule comprising forming the cavity extending vertically along an entire thickness of the first core plastic layer, the bi-adhesive material extending vertically along the entire thickness of the first core plastic layer.

18. The method according to claim 16, the cavity extending vertically from an upper side of the first core plastic layer to an inner portion of the first core plastic layer, the bi-adhesive material extending vertically along an entire depth of such cavity.

19. The method according to claim 18, further comprising, after the milling the cavity, performing pretreatment on the cavity by corona or plasma.

20. The method according to claim 13, further comprising applying a bi-coated high surface energy material between the antenna inlay and the first layer of polyurethane heat activatable glue.

21. The method according to claim 13, further comprising:

printing first and second overlay layers for customization using a dispersion of color ink and polyurethane heat activatable glue;

arranging the first and second overlay layers on external faces of the first and second core plastic layers, respectively;

the applying the pressure and the heat to the stack of layers bonding the first and second overlay layers to the first and second core plastic layer, respectively;

cutting the stack of layers to obtain single cards;

milling the single cards to obtain respective cavities for embedding respective micromodules; and embedding the respective micromodules using a bi-adhesive material.

\* \* \* \* \*